(12) United States Patent
Dunstan

(10) Patent No.: US 7,496,929 B2
(45) Date of Patent: Feb. 24, 2009

(54) PERFORMANCE OF OPERATIONS ON A HARDWARE RESOURCE THROUGH INTEGRAL INTERPRETIVE EXECUTION

(75) Inventor: Robert A. Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 10/857,104

(22) Filed: May 28, 2004

(65) Prior Publication Data

US 2005/0278526 A1 Dec. 15, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/320
(58) Field of Classification Search .................. 719/320
See application file for complete search history.

(56) References Cited

U.S. PATENT DOCUMENTS

| | | | | |
|---|---|---|---|---|
| 4,752,930 A | * | 6/1988 | Kitamura et al. ............ | 714/815 |
| 6,112,320 A | * | 8/2000 | Dien ............................ | 714/51 |
| 6,219,742 B1 | * | 4/2001 | Stanley ........................ | 710/260 |
| 6,324,644 B1 | * | 11/2001 | Rakavy et al. ................. | 713/1 |
| 6,598,169 B1 | * | 7/2003 | Warwick et al. ............. | 713/320 |
| 6,832,278 B2 | * | 12/2004 | Oshins et al. ................ | 710/104 |
| 7,069,543 B2 | * | 6/2006 | Boucher ....................... | 717/127 |
| 7,197,666 B1 | * | 3/2007 | Yin ................................ | 714/23 |
| 2002/0038328 A1 | * | 3/2002 | Morisawa ........................ | 709/1 |
| 2002/0170951 A1 | * | 11/2002 | Oshins et al. ................ | 235/375 |
| 2003/0065853 A1 | * | 4/2003 | Lary et al. .................... | 710/260 |
| 2004/0243534 A1 | * | 12/2004 | Culter et al. .................... | 707/1 |

OTHER PUBLICATIONS

ACPI Specification, Sep. 29, 2004, Revision 2.0c, Compaq et al., Sections 5.1 and 5.2.

* cited by examiner

*Primary Examiner*—Meng-Ai An
*Assistant Examiner*—KimbleAnn Verdi
(74) *Attorney, Agent, or Firm*—Schwabe, Williamson & Wyatt, P.C.

(57) ABSTRACT

A system and methods practiced thereon to effectuate performance of an operation on a hardware resource of the system through integral interpretive execution are described herein.

17 Claims, 3 Drawing Sheets

---

Sys indept BIOS services assess Data Structure to retrieve and instructions of requested HW OP
212

210

Sys indept BIOS services assess Data Structure interpretively execute retrieved instructions
214

PERFORMANCE OF OPERATIONS ON A HARDWARE RESOURCE THROUGH INTEGRAL INTERPRETIVE EXECUTION

FIELD OF THE INVENTION

The present invention relates generally to the field of data processing, in particular, to performance of operations on a hardware resource of a data processing system (which may also be referred to as a computing environment or a computing platform).

BACKGROUND OF THE INVENTION

For efficiency, reliability and other reasons, computing platforms often have a "standardized" abstraction layer through which operations on hardware resources of the platforms may be performed. For example, for personal computer (PC) platforms, Advanced Configuration and Power Interface (ACPI) Specification v2.0 provides for a System Description Table architecture to abstract operations that may be performed on various hardware resources of a platform. Typically, a shared interpreter is provided to effectuate performance of the operations, by interpetively executing appropriate ones of the instructions stored in the System Description Table, on request. Often times, the operating system (OS) includes a scheduler which responsibilities include scheduling execution of the shared interpreter.

Accordingly, during operation, when a need arrives to perform an operation on a hardware resource, e.g. the device driver of the hardware resource, the device driver would submit a request to an operating system service, which in due course results in the scheduler of the OS in scheduling the shared interpreter for execution. When given execution control, the shared interpreter accesses and retrieves the applicable instructions, and interpretively executes the retrieved instructions, effectuating performance of the operation on the hardware resource. Examples of hardware resources may include but are not limited to, memory, co-processors, communication interfaces and so forth.

The prior art suffers from at least the disadvantage that prior to the loading of the shared interpreter and the scheduler (e.g. during system start up), it is unable to service any component with a need to perform an operation on a hardware resource through the abstraction layer. Resultantly, each component with such a need is left to attend to the need itself, without the benefit of abstraction. For example, a basic input/output system (BIOS) service may need to perform an operation on a watch dog timer during start up, prior to the loading and availability of the shared interpreter and/or the scheduler.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, a system and methods practiced thereon to effectuate performance of operations on hardware resources of the system through integral interpretive execution.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials, and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

The phrase "in one embodiment" is used repeatedly. The phrase generally does not refer to the same embodiment; however, it may. The terms "comprising", "having" and "including" are synonymous, unless the context dictates otherwise.

Figure 1:
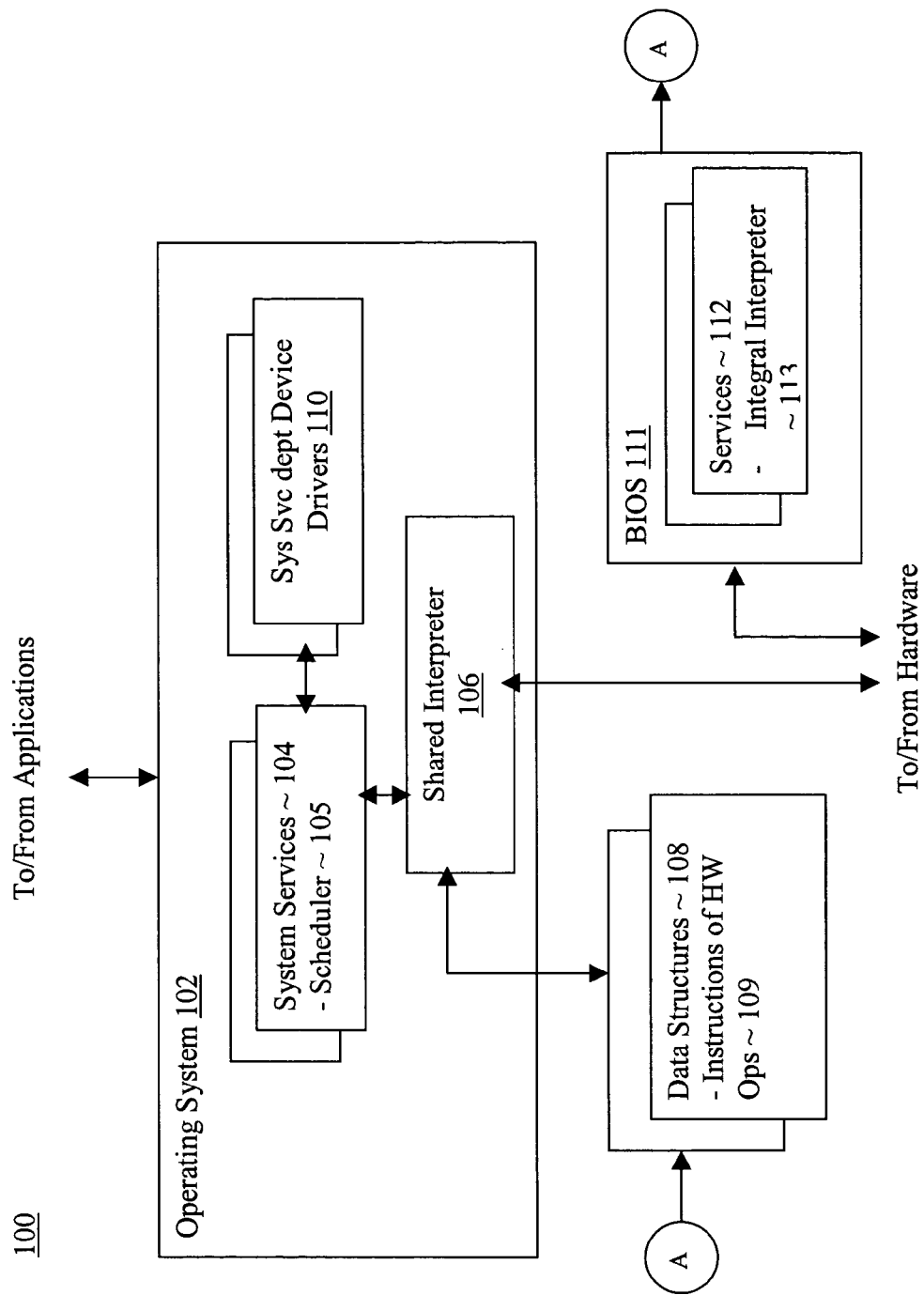
FIG. 1 illustrates a block diagram view of selected software components of a system, in accordance with various embodiments.

Referring now to FIG. 1, wherein a block diagram view of selected software components of a system, in accordance with various embodiments, is shown. As illustrated, for the embodiments, system (i.e. computing environment or platform) 100 includes OS 102, data structure 108, and basic input/output system (BIOS) 111, operatively coupled to each other. For the embodiment, OS 102 includes a number of system services (SS) 104, shared interpreter 106 and device drivers 110, operatively coupled to each other and the earlier enumerated elements. BIOS 111, on the other hand, includes a number of services or service modules 112.

SS 104 are employed to provide a number of system services for applications as well as other OS components, including, but are not limited, memory management, exception processing, and so forth. SS 104 includes in particular scheduler 105 to schedule processes or tasks for execution. For the purpose of this invention, the terms processes and tasks may be considered interchangeable.

Data structures 108 are employed to abstract the operations that may be performed on a number of hardware resources. In particular, abstraction data structures 108 include the corresponding instructions 109 to effectuate the various operations on the various hardware resources, when the instructions are executed. As described earlier, examples of these hardware resources may include, but are not limited to, co-processors, memory, networking interfaces, watch dog timer, and so forth.

Typically, SS dependent device drivers 110 are device drivers which do not have any need to perform any operation on any hardware resource prior to the loading and availability of scheduler 105 or shared interpreter 106, whereas OS initialization components or BIOS service module 112 may have such needs. An example of a SS dependent device driver 110 is a device driver for a networking interface. An example each of an OS initialization component and a BIOS system service 112 with such a need, is the OS loader and a BIOS system service, respectively, having a need to perform an operation on a watch dog timer during system start up.

As will be described in more detail below, SS dependent device drivers 110 effectuate performance of operations on hardware resources through system services 104, leveraging on the abstraction offered by data structures 108 through shared interpreter 106, whereas at least one of the OS loader and BIOS system services 112 effectuates performance of operations on hardware resources directly (integrally), but still leveraging on the abstraction offered by data structures 108. More specifically, the at least one OS loader or BIOS system services 112 includes integral interpreter 113 to facilitate effectuating performance of operations on hardware resources directly (integrally), leveraging on the abstraction offered by data structures 108.

Note that integration of interpreter 113 with each of the OS loader or BIOS system services 112 may be made easier if the number of operations that may be performed on a hardware resource are compactly/effectively designed, and efficiently abstracted/represented in the corresponding data structure 108

Additionally, for performance or other reasons, the invention may nonetheless be practiced with a system service 104 and/or a device driver 110 electing to operate like the OS loader or BIOS services 112, even the system service 104 or device driver 110 does not have a need to perform an operation on a hardware resource prior to the loading and availability of scheduler 104 and/or shared interpreter 106.

Further, while multiple SS dependent device drivers 110, and multiple BIOS system services 112 are illustrated for the embodiment, the invention is not so limited. The invention may be practiced with embodiments having any number of SS dependent device drivers 110, any number of BIOS system services 112, and any number of system services 104 and/or device drivers 110 having the capability of integrally and interpretively executing retrieved instructions from an abstraction to effectuate performance of operations on selected hardware resources.

Except for the inclusion of integral interpreter 113 in each of the OS loader and BIOS system services 112 (and optionally, selected ones of system services 104 and device drivers 110), and its/their manner(s) of operation, computing environment/platform 100, including operating system 102 and its components, may be a wide range of these elements known in the art or to be designed.

Figure 2B:
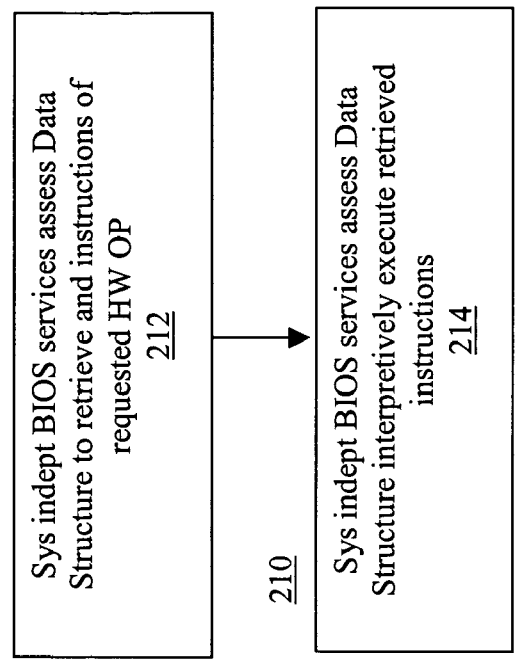
FIGS. 2a-2b illustrate methods for effectuating operations on hardware resources through and independent of operating system services, in accordance with the prior art and various embodiments of the present invention, respectively.
Figure 2A:
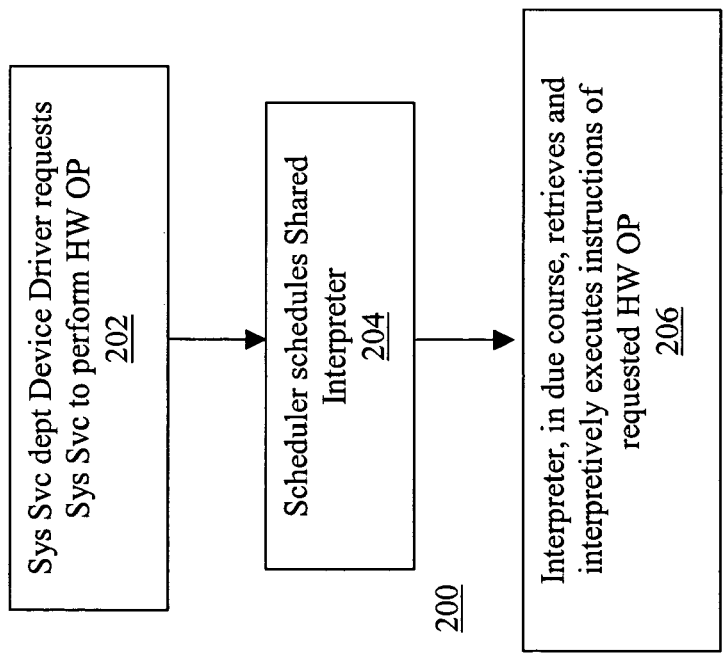

Referring now to FIGS. 2a-2b, wherein two flow chart views illustrating methods to effectuate operations on hardware resources through and independent of operating system services, in accordance with prior art and embodiments of the present invention, respectively, are shown.

As illustrated by FIG. 2a, for the prior are approach 200, a SS dependent device driver performs an operation on a hardware resource by submitting a request to perform the operation to an appropriate operating system service, block 202. What constitutes an appropriate operating system service is dependent on the resource type of the hardware resource, the nature of the operation to be performed, and so forth. Regardless of how and to whom the request is submitted, eventually, it leads to scheduler 106 in scheduling shared interpreter 106 for execution, block 204.

In due course, shared interpreter 106 is given execution control. At such time, shared interpreter 106 retrieves the appropriate instructions 109 from abstraction data structures 108, and interpretively executes the retrieved instructions, block 206, to effectuate performance of the requested operation on a hardware resource.

As illustrated by FIG. 2b, for the illustrated embodiments 210, the OS loader or a BIOS service 112 performs an operation on a hardware resource by directly accessing abstraction data structures 108, and retrieving the appropriate instructions 109, block 212. On retrieval, the OS loader or BIOS service 112 interpretively executes the retrieved instructions, using its integral interpreter, block 214, to effectuate performance of the desired operation on a hardware resource.

In various embodiments, abstraction data structures 108 are System Description Tables in accordance with the specifications provided by Advanced Configuration and Power Interface (ACPI) Specification v2.0. Tables 1-3 illustrate an example System Description Table for abstracting various operations that may be performed on an example hardware resource, a watch dog timer. More specifically, Tables 1-3 illustrate a System Description Table Header Section, a Capabilities, Configuration and Status Section, and a Device Specific Code Section of the System Description Table respectively, in accordance with the ACPI specification. Note that the operations that may be performed on the example watch dog timer are compactly abstracted/represented in these tables, making integration of the interpreter with the corresponding device driver easier.

TABLE 1

System Description Table Header Section

| Field<br>System<br>Description<br>Table Header | Byte<br>Length | Byte<br>Offset | Description |
|---|---|---|---|
| Signature | 4 | 0 | Of any alphanumeric characters, e.g. 'WDDT' |
| Length | 4 | 4 | In bytes, of entire WDDT table. |
| Revision | 1 | 8 | Any numeric value, e.g. 1 |
| Checksum | 1 | 9 | Any numeric value |
| OEMID | 6 | 10 | OEM Identifier, any alphanumeric value |
| OEM Table ID | 8 | 16 | OEM table ID, any alphanumeric value |
| OEM Revision | 4 | 24 | Revision level of Table, any alphanumeric value |
| Creator ID | 4 | 28 | Vendor ID of the utility that created the table, any alphanumeric value |
| Creator Revision | 4 | 32 | Revision of the utility that created the table, any alphanumeric value |

TABLE 2

Capabilities, Configuration and Status Section

| Field<br>Table Contents<br>(capabilities/<br>configuration/status) | Byte<br>Length | Byte<br>Offset | Description |
|---|---|---|---|
| WDT Spec Version | 2 | | Watchdog Timer Device Class Specification Version 1.0 = 0x0100 |
| WDDT Table Version | 2 | | Version of this table. Version 1.0 = 0x0100 |
| Timer Max Count | 2 | | Contains the maximum counter value that this WDT implementation supports. |
| Timer Min Count | 2 | | Contains the minimum allowable counter value that this WDT implementation supports. |
| Timer Count Period | 2 | | Contains the period of one count specified in milliseconds that this WDT supports. For example a WDT counting in seconds would report 1000. |
| Status | 2 | | Bit 0 - WDT Available bit (BIOS setup)<br>0 = permanently disabled<br>1 = available<br>Bit 1 - WDT Active bit (BIOS Setup). |

TABLE 2-continued

Capabilities, Configuration and Status Section

| Field Table Contents (capabilities/ configuration/status) | Byte Length | Byte Offset | Description |
|---|---|---|---|
| | | | Note: this bit is independent of the Ownership bit.<br>0 = WDT is stopped when BIOS hands off control<br>1 = WDT is running when BIOS hands off control<br>Bit 2 - reserved[1] for Ownership bit.<br>Note: this bit indicates the ownership of the WDT when the BIOS Handoff Support is set in the capability field.<br>0 = WDT is owned by they BIOS<br>1 = WDT is owned by the OS<br>Bits 3-10 - Reserved<br>Bit 11 - User Reset Event bit<br>1 = system reset result of a user-initiated reset<br>Bit 12 - WDT Event bit<br>1 = system reset result of WDT event<br>Bit 13 - Power Fail Event bit<br>1 = system reset result of abnormal power event<br>Bit 14 - Unknown Reset Event bit<br>1 = system reset result of a reset that was non user initiated and not due to the WDT logic<br>Bit 15 - Reserved |
| Capability | 2 | | Bit 0 - Auto Reset<br>Bit 1 - Alert Support<br>Bit 2 - Reserved for Platform Directed Shutdown<br>Bit 3 - Reserved for Immediate Shutdown<br>Bit 4 - Reserved for future BIOS Handoff Support<br>Bits 5-15 - Reserved |

TABLE 3

Device Specific Code Section

| Field Table Contents (code section) | Byte Length | Byte Offset | Description |
|---|---|---|---|
| Base Address Function Descriptions | 12 | | The base address of the WDT WDT Device functions:<br><br>Function   Description<br>Set Count   Sets the timeout value<br>Get Count   Returns the timeout value<br>Reload Count   Causes the WDT to be reloaded<br>Get Status   Returns the status of the WDT<br>Start WDT / Stop WDT   Two mutually exclusive functions to enable WDT<br>Shutdown / Reset / No Action   Three mutually exclusive actions the WDT can take when it expires |

TABLE 3-continued

Device Specific Code Section

| Field Table Contents (code section) | Byte Length | Byte Offset | Description |
|---|---|---|---|
| Set Count | 12 | | This code is used to set the count.<br><br>Field  Byte Length  Description<br>Actions  1  0x01 (Number of Actions)<br>Offset  2  0x01<br>Mask  8  0x3f (Enforce max count)<br>Action  2  0x02 (Write Data AND Mask) |
| Get Count | 12 | | This code returns the present WDT count.<br><br>Field  Byte Length  Description<br>Actions  1  0x01 (Number of Actions)<br>Offset  2  0x00<br>Mask  8  0x3f (Mask off extraneous bits)<br>Action  2  0x08 (Read Data AND Mask) |
| Reload Count | 12 | | This code causes the WDT to reload its count register.<br><br>Field  Byte Length  Description<br>Actions  1  0x01 (Number of Actions)<br>Offset  2  0x00<br>Mask  8  0x00 (Dummy value)<br>Action  2  0x04 (Write Mask) |
| Start WDT | 12 | | Execution of this code causes the WDT to begin (or resume) counting.<br><br>Field  Byte Length  Description<br>Actions  1  0x01 (Number of Actions)<br>Offset  2  0x09<br>Mask  8  0xf7 (Isolate Enable Bit)<br>Action  2  0x05 (Write/Read Data AND Mask) |
| Stop WDT | 12 | | Execution of this code causes the WDT to stop counting.<br><br>Field  Byte Length  Description<br>Actions  1  0x01 (Number of Actions)<br>Offset  2  0x09<br>Mask  8  0x08 (Isolate Enable Bit)<br>Action  2  0x06 (Write/Read Data OR Mask) |
| Shutdown WDT | 24 | | To shut down WDT when the timer expires<br><br>Field  Byte Length  Description<br>Actions  1  0x02 (Number of Actions)<br>Offset  2  0x09 |

TABLE 3-continued

Device Specific Code Section

| Field Table Contents (code section) | Byte Length | Byte Offset | Description | | |
|---|---|---|---|---|---|
| | | | Mask | 8 | 0xf8 |
| | | | Action | 2 | 0x08 (Read AND Mask) |
| | | | Offset | 2 | 0x09 |
| | | | Mask | 8 | 0x04 |
| | | | Action | 2 | 0x03 (Write OR Mask) |
| Reset WDT | 24 | | To reset WDT when the timer expires | | |
| | | | Field | Byte Length | Description |
| | | | Actions | 1 | 0x02 (Number of Actions) |
| | | | Offset | 2 | 0x09 |
| | | | Mask | 8 | 0xf8 |
| | | | Action | 2 | 0x08 (Read AND Mask) |
| | | | Offset | 2 | 0x09 |
| | | | Mask | 8 | 0x02 |
| | | | Action | 2 | 0x03 (Write OR Mask) |
| Do Nothing WDT | 24 | | To issue alert, but take no further action, when the timer expires | | |
| | | | Field | Byte Length | Description |
| | | | Actions | 1 | 0x02 (Number of Actions) |
| | | | Offset | 2 | 0x09 |
| | | | Mask | 8 | 0xf8 |
| | | | Action | 2 | 0x08 (Read AND Mask) |
| | | | Offset | 2 | 0x09 |
| | | | Mask | 8 | 0x01 |
| | | | Action | 2 | 0x03 (Write OR Mask) |

Figure 3:
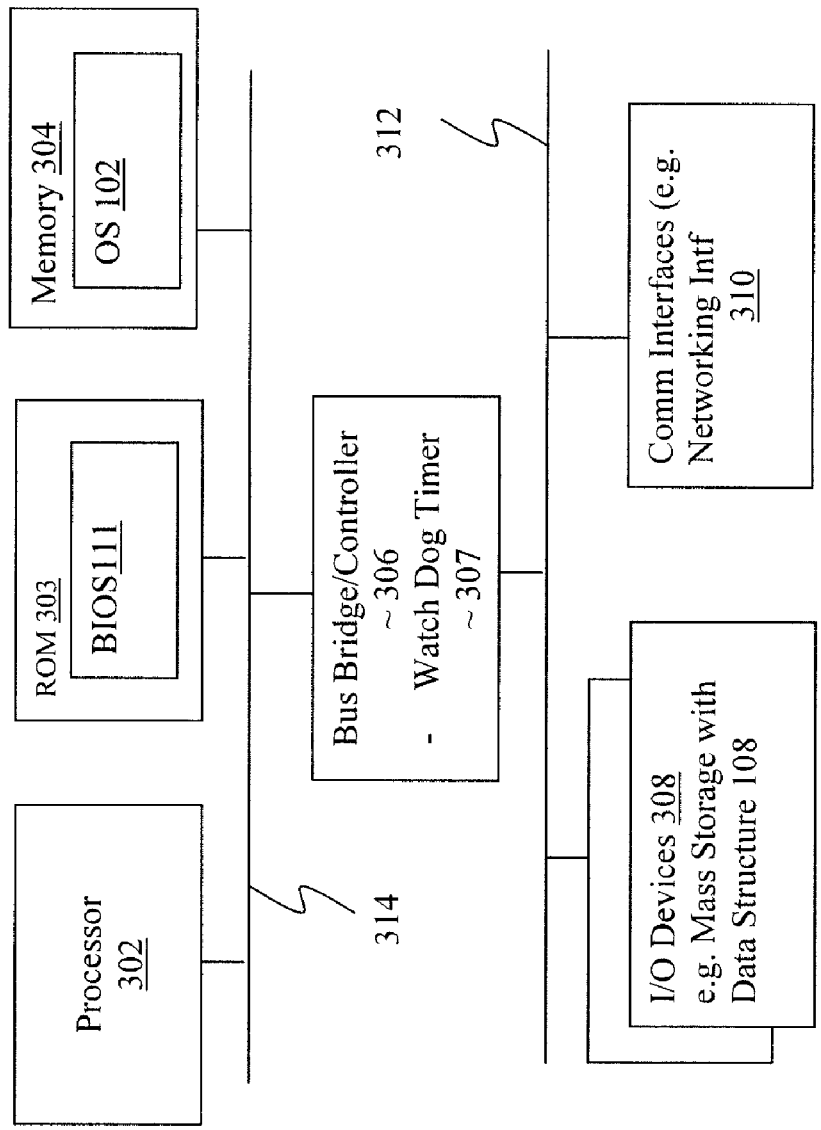
FIG. 3 illustrates a block diagram view of selected hardware components of the system of FIG. 1, in accordance with various embodiments.

FIG. 3 illustrates an example system incorporated with the operating system of FIG. 1, in accordance with one embodiment. As illustrated, example system (i.e. computing environment or platform) 300 includes processor 302, read-only memory 303, system memory 304, bus bridge/controller 306, a number of I/O devices 308, and communication interface 310, coupled to each other via buss 312-314. Read-only memory 303 includes in particular, BIOS 111 of FIG. 1. System memory 304 includes in particular, OS 102 of FIG. 1, and bus bridge/controller 306 includes in particular, a watch dog timer 307. Further, BIOS 111 includes a service module 112 having a need to perform one or more operations on the watch dog timer 307, prior to the availability of the scheduler and shared interpreter of OS 102, and I/O devices 308 include in particular, a mass storage device (such as, a disk) having stored therein abstraction data structure 108. Abstraction data structure 108 includes the various instructions for performing various operations on watch dog timer 307. As described earlier, the OS loader and/or BIOS service module 112 is equipped with direct/integral interpretive execution ability, leveraging on the abstraction offered by data structure 108, to effectuate performance of the desired operations on watch dog timer 307.

Except for the incorporation of BIOS 111, including the incorporation of the integral interpretive execution ability with a service module 112, or with the OS loader, to effectuate operations on the watch dog timer (leveraging on abstraction data structure 108), elements 302-310 may be a broad range of these elements known in the art or to be designed. In particular, examples of I/O devices 306 may further include, but not limited to, a keyboard, pointing devices, display, communication/networking interfaces (both wire line based or wireless), and so forth.

In various embodiments, OS 102, BIOS 111 and abstraction data structure 108 may be pre-loaded onto system 300, downloaded from a remote server and/or a distribution medium, such as a distribution compact disk (CD). Further, in various embodiments, example system 300 may be a server, a desktop computer, a laptop computer, a tablet computer, a hand held computing device, and so forth. In other embodiments, example system 300 may be a set-top box, a CD player, a DVD player, a digital camera, a digital camcorder, a wireless mobile phone, and so forth.

Thus, a novel system and methods practiced thereon to effectuate performance of an operation on a hardware resource of the system through direct interpretive execution (leveraging on abstraction) have been described. Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. An apparatus comprising:
   a first hardware resource, wherein the first hardware resource is a watch dog timer;
   first storage medium having stored therein a first abstraction data structure including first one or more instructions to be retrieved and executed to enable a first operation to be performed on the first hardware resource,
   second storage medium including a basic input/output system (BIOS), having stored therein a service module including an integral interpreter equipped to interpretively execute the first one or more instructions, when retrieved, to enable performance of the first operation on the first hardware resource, and second one or more instructions designed to access the first abstraction data structure to retrieve the first one or more instructions for the integral interpreter; and
   a processor coupled to the first hardware resource, the first storage medium, the second storage medium, and the BIOS to execute the service module, including the second one or more instructions and the integral interpreter;
   wherein the first abstraction data structure comprises an Advanced Configuration and Power Interface Specification (ACPI) Description Table of the watch dog timer; and
   wherein the apparatus further comprises a second hardware resource;
   wherein the first storage medium further comprises
      a second abstraction data structure including third one or more instructions to be executed to enable a second operation to be performed on the second hardware resource;
      a shared interpreter to interpretively execute the third one or more instructions, when retrieved, to enable performance of the second operation on the second hardware resource;
      a scheduler to schedule execution of the shared interpreter; and a device driver including fourth one or more instructions to request the scheduler to schedule the shared interpreter to interpretively execute the third one or more instructions, when retrieved, to enable performance of the second operation on the second hardware resource; and the processor is further coupled to the second hardware resource, and provided to execute the device driver, the scheduler, and the shared interpreter.

2. The apparatus of claim 1, wherein the first operation is an operation selected from a group consisting of a Start Watch Dog Timer operation and a Stop Watch Dog Timer operation.

3. The apparatus of claim 1, wherein the first operation is an operation selected from a group consisting of a Set Count operation, a Get Count operation, a Reload Count operation, and a Get Status operation.

4. The apparatus of claim 1, wherein the ACPI Description Table for the watch dog timer comprises a System Description Table Header as follows:

| Field System Description Table Header | Byte Length | Byte Offset | Description |
|---|---|---|---|
| Signature | 4 | 0 | Of any alphanumeric characters, e.g. 'WDDT' |
| Length | 4 | 4 | In bytes, of entire WDDT table. |
| Revision | 1 | 8 | Any numeric value, e.g. 1 |
| Checksum | 1 | 9 | Any numeric value |
| OEMID | 6 | 10 | OEM Identifier, any alphanumeric value |
| OEM Table ID | 8 | 16 | OEM table ID, any alphanumeric value |
| OEM Revision | 4 | 24 | Revision level of Table, any alphanumeric value |
| Creator ID | 4 | 28 | Vendor ID of the utility that created the table, any alphanumeric value |
| Creator Revision | 4 | 32 | Revision of the utility that created the table, any alphanumeric value. |

5. The apparatus of claim 4, wherein the ACPI Description Table for the watch dog timer further comprises a Capabilities, Configuration and Status Section as follows:

| Field Table Contents (capabilities/ configuration/status) | Byte Length | Byte Offset | Description |
|---|---|---|---|
| WDT Spec Version | 2 | | Watchdog Timer Device Class Specification Version |
| WDDT Table Version | 2 | | Version of this table. |
| Timer Max Count | 2 | | Contains the maximum counter value that this WDT implementation supports. |
| Timer Min Count | 2 | | Contains the minimum allowable counter value that this WDT implementation supports. |
| Timer Count Period | 2 | | Contains the period of one count specified in milliseconds that this WDT supports. |
| Status | 2 | | Bit 0 - WDT Available bit (BIOS setup) 0 = permanently disabled 1 = available Bit 1 - WDT Active bit (BIOS Setup). 0 = WDT is stopped when BIOS hands off control 1 = WDT is running when BIOS hands off control Bit 2 - reserved[1] for Ownership bit. 0 = WDT is owned by they BIOS 1 = WDT is owned by the OS Bits 3-10 - Reserved Bit 11 - User Reset Event bit 1 = system reset result of a user-initiated reset Bit 12 - WDT Event bit 1 = system reset result of WDT event Bit 13 - Power Fail Event bit 1 = system reset result of abnormal power event Bit 14 - Unknown Reset Event bit 1 = system reset result of a reset that was non user initiated and not due to the WDT logic Bit 15 - Reserved |
| Capability | 2 | | Bit 0 - Auto Reset Bit 1 - Alert Support Bit 2 - Reserved for Platform Directed Shutdown Bit 3 - Reserved for Immediate Shutdown Bit 4 - Reserved for future BIOS Handoff Support Bits 5-15 - Reserved. |

6. The apparatus of claim 5, wherein the ACPI Description Table for the watch dog timer further comprises a Device Specific Code Description as follows:

| Field Table Contents (code section) | Byte Length | Byte Offset | Description |
|---|---|---|---|
| Base Address Function Descriptions | 12 | | The base address of the WDT WDT Device functions: Function / Description Set Count — Sets the timeout value Get Count — Returns the timeout value Reload Count — Causes the WDT to be reloaded Get Status — Returns the status of the WDT Start WDT / Stop WDT — Two mutually exclusive functions to enable WDT Shutdown / Reset / No Action — Three mutually exclusive actions the WDT can take when it expires |
| Set Count | 12 | | This code is used to set the count. Field / Byte Length / Description Actions — 1 — 0x01 (Number of Actions) Offset — 2 — 0x01 Mask — 8 — 0x3f (Enforce max count) |

-continued

| Field Table Contents (code section) | Byte Length | Byte Offset | Description | | | |
|---|---|---|---|---|---|---|
| | | | Action | 2 | 0x02 (Write Data AND Mask) | |
| Get Count | 12 | | This code returns the present WDT count. | | | |
| | | | Field | Byte Length | Description | |
| | | | Actions | 1 | 0x01 (Number of Actions) | |
| | | | Offset | 2 | 0x00 | |
| | | | Mask | 8 | 0x3f (Mask off extraneous bits) | |
| | | | Action | 2 | 0x08 (Read Data AND Mask) | |
| Reload Count | 12 | | This code causes the WDT to reload its count register. | | | |
| | | | Field | Byte Length | Description | |
| | | | Actions | 1 | 0x01 (Number of Actions) | |
| | | | Offset | 2 | 0x00 | |
| | | | Mask | 8 | 0x00 (Dummy value) | |
| | | | Action | 2 | 0x04 (Write Mask) | |
| Start WDT | 12 | | Execution of this code causes the WDT to begin (or resume) counting. | | | |
| | | | Field | Byte Length | Description | |
| | | | Actions | 1 | 0x01 (Number of Actions) | |
| | | | Offset | 2 | 0x09 | |
| | | | Mask | 8 | 0xf7 (Isolate Enable Bit) | |
| | | | Action | 2 | 0x05 (Write/Read Data AND Mask) | |
| Stop WDT | 12 | | Execution of this code causes the WDT to stop counting. | | | |
| | | | Field | Byte Length | Description | |
| | | | Actions | 1 | 0x01 (Number of Actions) | |
| | | | Offset | 2 | 0x09 | |
| | | | Mask | 8 | 0x08 (Isolate Enable Bit) | |
| | | | Action | 2 | 0x06 (Write/Read Data OR Mask) | |
| Shutdown WDT | 24 | | To shut down WDT when the timer expires | | | |
| | | | Field | Byte Length | Description | |
| | | | Actions | 1 | 0x01 (Number of Actions) | |
| | | | Offset | 2 | 0x09 | |
| | | | Mask | 8 | 0xf8 | |
| | | | Action | 2 | 0x08 (Read AND Mask) | |
| | | | Offset | 2 | 0x09 | |
| | | | Mask | 8 | 0x04 | |
| | | | Action | 2 | 0x03 (Write OR Mask) | |
| Reset WDT | 24 | | To reset WDT when the timer expires | | | |
| | | | Field | Byte Length | Description | |
| | | | Actions | 1 | 0x02 (Number of Actions) | |
| | | | Offset | 2 | 0x09 | |
| | | | Mask | 8 | 0xf8 | |
| | | | Action | 2 | 0x08 (Read AND Mask) | |
| | | | Offset | 2 | 0x09 | |
| | | | Mask | 8 | 0x02 | |
| | | | Action | 2 | 0x03 (Write OR Mask) | |
| Do Nothing WDT | 24 | | To issue alert, but take no further action, when the timer expires | | | |
| | | | Field | Byte Length | Description | |
| | | | Actions | 1 | 0x02 (Number of Actions) | |
| | | | Offset | 2 | 0x09 | |
| | | | Mask | 8 | 0xf8 | |
| | | | Action | 2 | 0x08 (Read AND Mask) | |
| | | | Offset | 2 | 0x09 | |
| | | | Mask | 8 | 0x01 | |
| | | | Action | 2 | 0x03 (Write OR Mask). | |

7. The apparatus of claim 1, wherein the first abstraction data structure comprises an Advanced Configuration and Power Interface Specification (ACPI) Description Table.

8. The apparatus of claim 1, wherein the service module is a selected one of a basic input/output system service module, an operating system device driver, an operating system loader, and an exception handler.

9. The apparatus of claim 1, wherein the first and second abstraction data structures comprise a first ACPI Description Table of the first hardware resource, and a second ACPI Description Table of the second hardware resource, respectively.

10. In a computing platform, a method comprising:
   a service module included in a basic input/output system (BIOS) of the computing platform directly accessing a first abstraction data structure to retrieve first one or more instructions, designed to enable a first operation on a first hardware resource of the computing platform, when executed;
   the service module interpretively executing the retrieved first one or more instructions to enable the first operation on the first hardware resource;
   a device driver of the computing platform requesting a scheduler of an operating system to schedule a shared interpreter of the operating system to execute second one or more instructions, when retrieved, to enable a second operation on a second hardware resource;
   the scheduler scheduling the shared interpreter to retrieve and execute the second one or more instructions;
   the shared interpreter accessing a second abstraction data structure to retrieve the second one or more instructions; and
   the shared interpreter interpretively executing the retrieved second one or more instructions to enable the second operation on the second hardware resource wherein the first abstraction data structure is stored in a first storage module that is separate from the BIOS;

wherein the first and second abstraction data structures comprise a first ACPI Description Table of the first hardware resource, and a second ACPI Description Table of the second hardware resource, respectively;

wherein said accessing by the service module comprises the service module traversing a first Device Specific Code Description of the first ACPI Description Table to retrieve the first one or more instructions; and wherein said accessing by the shared interpreter comprises the shared interpreter traversing a second Device Specific Code Description of the second ACPI Description Table to retrieve the second one or more instructions.

11. The method of claim 10, wherein said accessing comprises the device driver traversing a Device Specific Code Description of the ACPI Description Table to retrieve the first one or more instructions.

12. In a computing platform, a method comprising:

a service module included in a basic input/output system (BIOS) of the computing platform directly accessing a first abstraction data structure to retrieve first one or more instructions, designed to enable a first operation on a first hardware resource of the computing platform, when executed;

the service module interpretively executing the retrieved first one or more instructions to enable the first operation on the first hardware resource;

a device driver of the computing platform requesting a scheduler of an operating system to schedule a shared interpreter of the operating system to execute second one or more instructions, when retrieved, to enable a second operation on a second hardware resource;

the scheduler scheduling the shared interpreter to retrieve and execute the second one or more instructions;

the shared interpreter accessing a second abstraction data structure to retrieve the second one or more instructions; and the shared interpreter interpretively executing the retrieved second one or more instructions to enable the second operation on the second hardware resource wherein the first abstraction data structure is stored in a first storage module that is separate from the BIOS;

wherein said direct accessing and interpretive executing by said service module are performed prior to the availability of the operating system.

13. An apparatus comprising:

a first storage medium configured to store a first abstraction data structure including first one or more instructions designed to enable performance of a first operation on a first hardware resource of a computing platform, when executed; and a second storage medium including a basic input/output system (BIOS), having stored therein a service module including an integral interpreter equipped to interpretively execute the first one or more instructions, when retrieved, to enable performance of the first operation on the first hardware resource, and second one or more instructions designed to access the first abstraction data structure to retrieve the first one or more instructions for the integral interpreter;

a processor coupled to the first hardware resource, the first storage medium, the second storage medium, and the BIOS to execute the service module, including the second one or more instructions and the integral interpreter;

a shared interpreter designed to access an abstraction data structure to retrieve one or more instructions, and execute the retrieved one or more instructions to enable performance of an operation on a hardware resource;

a scheduler to schedule execution of the shared interpreter; and a device driver designed to request the scheduler to schedule the shared interpreter to access a second abstraction data structure to retrieve second one or more instructions, and execute the retrieved second one or more instructions to enable performance of a second operation on a second hardware resource;

wherein the first and second abstraction data structures comprise a first ACPI Description Table of the first hardware resource, and a second ACPI Description Table of the second hardware resource, respectively.

14. A system comprising:

a processor;

a system memory;

a watch dog timer;

a mass storage having stored therein a first ACPI Description Table of the watch dog timer including first one or more instructions to be executed, when retrieved, to enable a first operation to be performed on the watch dog timer;

a read-only memory, separate from the mass storage, having stored therein a basic input/output system (BIOS) that includes a service module including an integral interpreter equipped to interpretively execute the first one or more instructions, when retrieved, to effectuate performance of the first operation on the watch dog timer, and second one or more instructions designed to access the first ACPI Description Table of the watch dog timer to retrieve the first one or more instructions for the integral interpreter; and a bus coupling the processor, the system memory, the watch dog timer, the read-only memory, and the mass storage to one another;

wherein the apparatus further comprises a hardware resource;

wherein the mass storage further comprises an abstraction data structure including third one or more instructions to be executed to enable a second operation to be performed on the hardware resource;

a shared interpreter to interpretively execute the third one or more instructions, when retrieved, to enable performance of the second operation on the hardware resource;

a scheduler to schedule execution of the shared interpreter; and a device driver including fourth one or more instructions to request the scheduler to schedule the interpreter to interpretively execute the third one or more instructions, when retrieved, to enable performance of the second operation on the hardware resource; and the processor is further coupled to the hardware resource, and provided to execute the device driver, the scheduler, and the shared interpreter.

15. The system of claim 14, wherein the first operation is an operation selected from a group consisting of a Start Watch Dog Timer operation, a Stop Watch Dog Timer operation, a Set Count operation, a Get Count operation, a Reload Count operation, and a Get Status operation.

16. The system of claim 14, wherein the system further comprises a controller coupled to the bus, and the watch dog timer is integrated with the controller.

17. The system of claim 14, wherein the system selected from a group consisting of a set-top box, a digital camera, a digital versatile disk player, and a compact disc player.

* * * * *